US012194487B1

(12) United States Patent
Albelo

(10) Patent No.: US 12,194,487 B1
(45) Date of Patent: Jan. 14, 2025

(54) LIQUID DISPENSING SYSTEM

(71) Applicant: Eliú Albelo, Kissimmee, FL (US)

(72) Inventor: Eliú Albelo, Kissimmee, FL (US)

( * ) Notice: Subject to any disclaimer, the term of this patent is extended or adjusted under 35 U.S.C. 154(b) by 0 days.

(21) Appl. No.: 18/444,911

(22) Filed: Feb. 19, 2024

(51) Int. Cl.
*B05B 9/08* (2006.01)

(52) U.S. Cl.
CPC .......... *B05B 9/0861* (2013.01); *B05B 9/0888* (2013.01)

(58) Field of Classification Search
USPC .......................................................... 222/175
See application file for complete search history.

(56) References Cited

U.S. PATENT DOCUMENTS 5,048,705 A * 9/1991 Lynd .................. B65D 51/1683 215/229
5,265,769 A * 11/1993 Wilson ................... A47G 21/18 222/610
5,704,529 A * 1/1998 Santoro ..................... A45F 3/04 224/629
6,142,345 A * 11/2000 Laible .................. B67D 7/0277 222/189.1
8,225,974 B2 * 7/2012 Zheng ....................... A45F 3/08 224/628
10,548,361 B1 * 2/2020 Suttman ..................... A45F 3/16
11,440,037 B1 * 9/2022 Brookins .............. B05B 9/0403
2002/0170935 A1 * 11/2002 Annis ................... A61M 1/062 224/655
2004/0135004 A1 * 7/2004 Fex ..................... A01M 7/0046 239/152
2005/0006400 A1 * 1/2005 Shapanus .............. B05B 9/0861 222/1
2006/0091235 A1 * 5/2006 Langhans ............. B05B 7/1422 239/152
2006/0243765 A1 * 11/2006 Valeriana .................. A45F 3/04 224/148.2
2009/0101670 A1 * 4/2009 Restive ................... B01F 25/85 222/413
2010/0155447 A1 * 6/2010 Zheng ....................... A45F 3/08 224/629
2019/0030554 A1 * 1/2019 Mantes ................. B05B 9/0861
2019/0060921 A1 * 2/2019 Henriksen ............... B05B 12/12
2019/0125908 A1 * 5/2019 Swartz ...................... A61L 2/18
2019/0224703 A1 * 7/2019 Gustafson ............. B05B 9/0888
2019/0388918 A1 * 12/2019 Gustafson ............. B05B 9/0861

(Continued)

FOREIGN PATENT DOCUMENTS

WO WO-2023172614 A1 * 9/2023

*Primary Examiner* — Paul R Durand
*Assistant Examiner* — Michael J. Melaragno
(74) *Attorney, Agent, or Firm* — Jason T. Daniel, Esq.; Daniel Law Offices, P.A.

(57) ABSTRACT

A liquid dispensing system includes a main body in the form of a malleable and padded backpack having a plurality of pockets. A soft sided malleable liquid reservoir is removably positioned within one of the backpack pockets, and functions to receive and store a liquid. A battery-operated pump is positioned within a second pocket and is connected to the reservoir via a first hose and a dispensing nozzle via a second hose. A controller having a power source is positioned within a third pocket and is connected to the pump. A remote-control device is connected to the controller for allowing a user to remotely activate the pump to supply pressurized liquid from the reservoir to the dispensing nozzle which is routed along one of the shoulder straps of the backpack body.

12 Claims, 6 Drawing Sheets

(56) References Cited

U.S. PATENT DOCUMENTS

| | | | | |
|---|---|---|---|---|
| 2019/0388923 | A1* | 12/2019 | Giacalone | B05B 12/00 |
| 2021/0046494 | A1* | 2/2021 | Lam | B05B 9/0888 |
| 2021/0078026 | A1* | 3/2021 | Suardika | B05B 11/0056 |
| 2021/0315363 | A1* | 10/2021 | Krulik | A61L 2/26 |
| 2022/0134369 | A1* | 5/2022 | Gustafson | B05B 9/0861<br>239/11 |
| 2023/0330283 | A1* | 10/2023 | Ruiz | A45F 3/04 |
| 2023/0390794 | A1* | 12/2023 | Bauer | B05B 12/08 |
| 2024/0001384 | A1* | 1/2024 | Li | F16L 33/223 |

* cited by examiner

LIQUID DISPENSING SYSTEM

TECHNICAL FIELD

The present invention relates generally to devices for storing and dispensing liquids, and more particularly to a wearable liquid dispensing system having malleable body components.

BACKGROUND

The statements in this section merely provide background information related to the present disclosure and may not constitute prior art.

Professional automotive window tinters utilize soapy water to adhere tint to vehicular windows. Traditionally, installers would utilize a large keg or bucket that was filled with a soapy solution positioned outside of the vehicle. An electric pump was connected to one or more elongated hoses for dispensing the liquids onto the windows. Unfortunately, this system has many drawbacks, as the bucket would often tip over spilling the contents onto the surrounding area, and the pump had to be plugged into an electrical outlet, thus reducing the number of locations where the system could be used. Moreover, it was extremely common for the long hoses to become snagged on the different parts of the vehicle, thus making the use of this system impractical.

In response to these issues, many installers currently use handheld mechanical spray bottles to apply the soapy water to the windows. Although more practical than the above-noted systems, these spray bottles also suffer from many drawbacks. For example, most bottles are only able to hold about 32 ounces of liquid at a time, which is woefully inadequate to install tint on a single vehicle, and the process of manually squeezing the bottle handle repeatedly throughout the installation process is extremely tiresome. Additionally, there is a major problem wherein when the bottle is not in use, the installer must leave it unattended, and many times this results in the liquids within the bottle spilling onto the vehicle's interior.

Although there are known types of backpack mounted mechanical pump spraying devices, such systems are constructed from hardened plastic or metallic components which are not suitable for use with window tinting installation services. Specifically, because these systems utilize rigid components (e.g., plastic tanks, rigid pump handles, etc.), such bulky components would not allow the installer to freely move about the interior of the vehicle to access each window without causing the device to constantly impact the vehicles seats, dashboard and/or ceiling panels causing impact damage and scratches to the same.

Accordingly, it would be beneficial to provide a wearable malleable liquid dispensing system that can allow an installer to freely move about the interior of a vehicle to spray liquids onto each window in a manner that alleviates the drawbacks noted above.

SUMMARY OF THE INVENTION

The present invention is directed to a liquid dispensing system. One embodiment of the present invention can include a main body in the form of a malleable and padded backpack having a plurality of pockets. In one embodiment, a soft sided malleable liquid reservoir is removably positioned within one of the backpack pockets, and functions to receive and store a liquid. A battery-operated pump can be positioned within a second pocket and can be connected to the reservoir via a first hose and a dispensing nozzle via a second hose. A controller having a power source can be positioned within a third pocket and can be connected to the pump.

In one embodiment, the controller can be connected to a remote-control device for allowing a user to remotely activate the pump. When activated, the pump can supply liquid from the reservoir under pressure to the dispensing nozzle which is routed along one of the shoulder straps of the backpack body.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
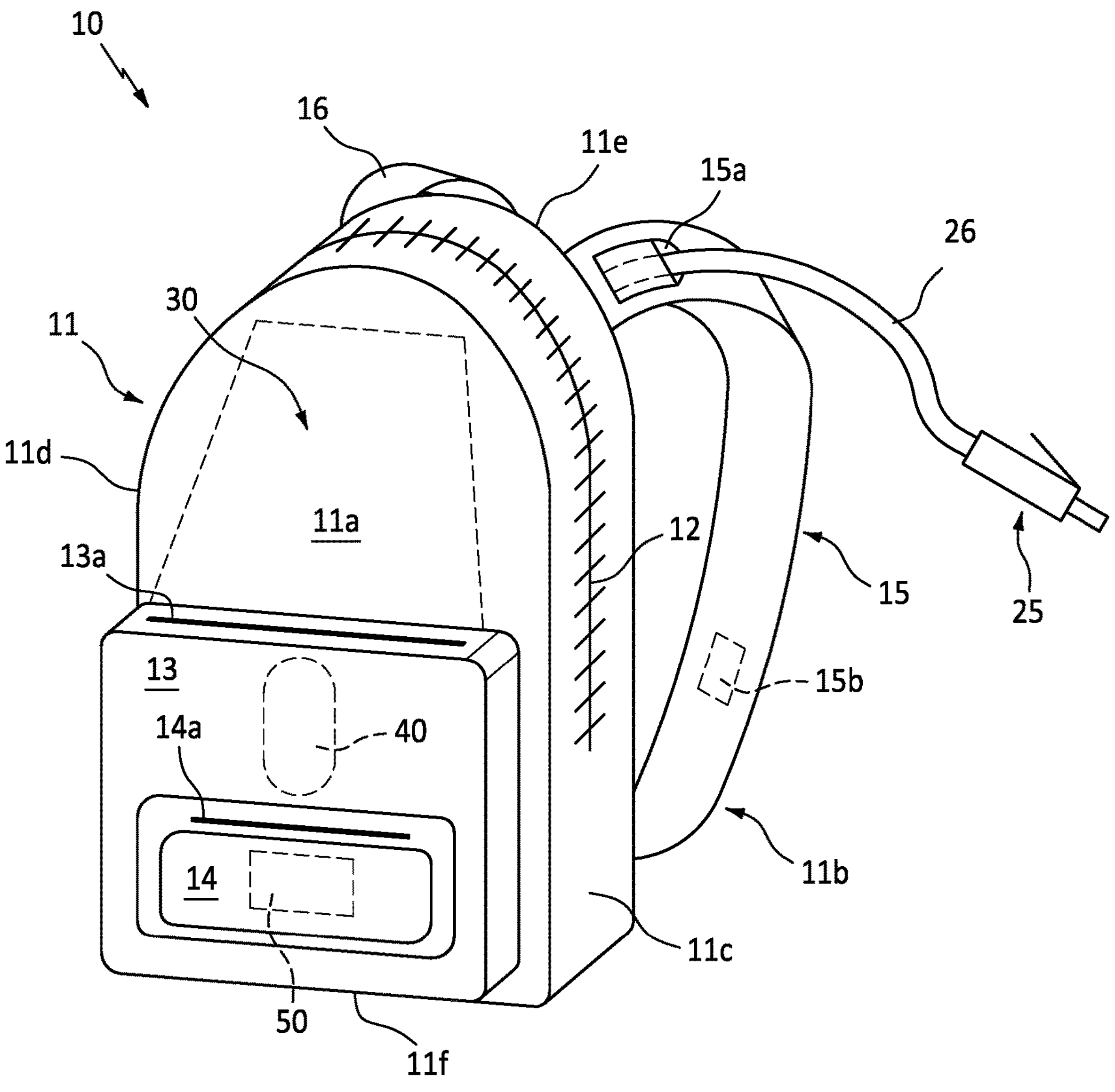
FIG. 1 is a perspective view of a liquid dispensing system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term “removably secured,” and derivatives thereof shall be used to describe a situation wherein two or more objects are joined together in a non-permanent manner so as to allow the same objects to be repeatedly joined and separated.

As described herein, the term “connector” includes any number of different elements that work alone or together to repeatedly join two items together in a nonpermanent manner. Several nonlimiting examples of connectors include, but are not limited to, flexible strips of interlocking projections with a slider (i.e., zipper), thread-to-connect, twist-to-connect, and push-to-connect type devices, opposing strips of hook and loop material (e.g., Velcro®), attractively oriented magnetic elements or magnetic and metallic elements, buckles such as side release buckles, clamps, sockets, clips, carabiners, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

As described throughout this document, the term “complementary shape,” and “complementary dimension,” shall be used to describe a shape and size of a component that is identical to, or substantially identical to the shape and size of another identified component within a tolerance such as, for example, manufacturing tolerances, measurement tolerances or the like.

FIGS. 1-6 illustrate one embodiment of a liquid spray system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms “upper,” “bottom,” “right,” “left,” “front,” “vertical,” “horizontal,” and derivatives thereof, shall relate to the invention as oriented in FIG. 1.

As shown best at FIG. 1, the system 10 can include a malleable backpack body 11 having a front surface 11*a*, a back surface 11*b*, a pair of opposing sides 11*c* and 11*d*, a top end 11*e*, and a bottom end 11*f*, that define a central interior pocket that is accessible via a zipper 12 or other type of connector. In one embodiment, a pump pocket 13 and controller pocket 14 can extend serially outward from the front surface 11*a* and can each be accessible via additional zippers 13*a* and 14*a*, respectively.

In one embodiment, a pair of shoulder straps 15 and 16 can be provided along the exterior of the backpack body. The shoulder straps can function in the expected manner to allow a wearer to position and carry the backpack on their back or shoulders. In various embodiments, the shoulder straps may be individually padded and can include any number of length adjusting mechanisms to allow a user to adjust the straps to fit their body.

In one embodiment, an opening 15*a* can be provided along the shoulder strap through which the discharge hose 26 and nozzle 25 can be located. Likewise, a pocket 15*b* can be provided for receiving and storing the below described remote control 60.

As described herein, the main body 11 can be manufactured to include any number of different shapes and sizes and may include any number of other pockets or compartments for receiving and storing an unlimited number of different items. Each of these pockets may be located anywhere along or within the main body. In either instance, the backpack body will preferably be constructed from a strong fabric material such as nylon, cotton canvas, polyester pack cloth, PVC fabric and the like so as to be completely malleable while remaining a soft/non-abrasive outer surface so as to not scratch paint or other delicate surfaces into which the bag may make contact.

Figure 2:
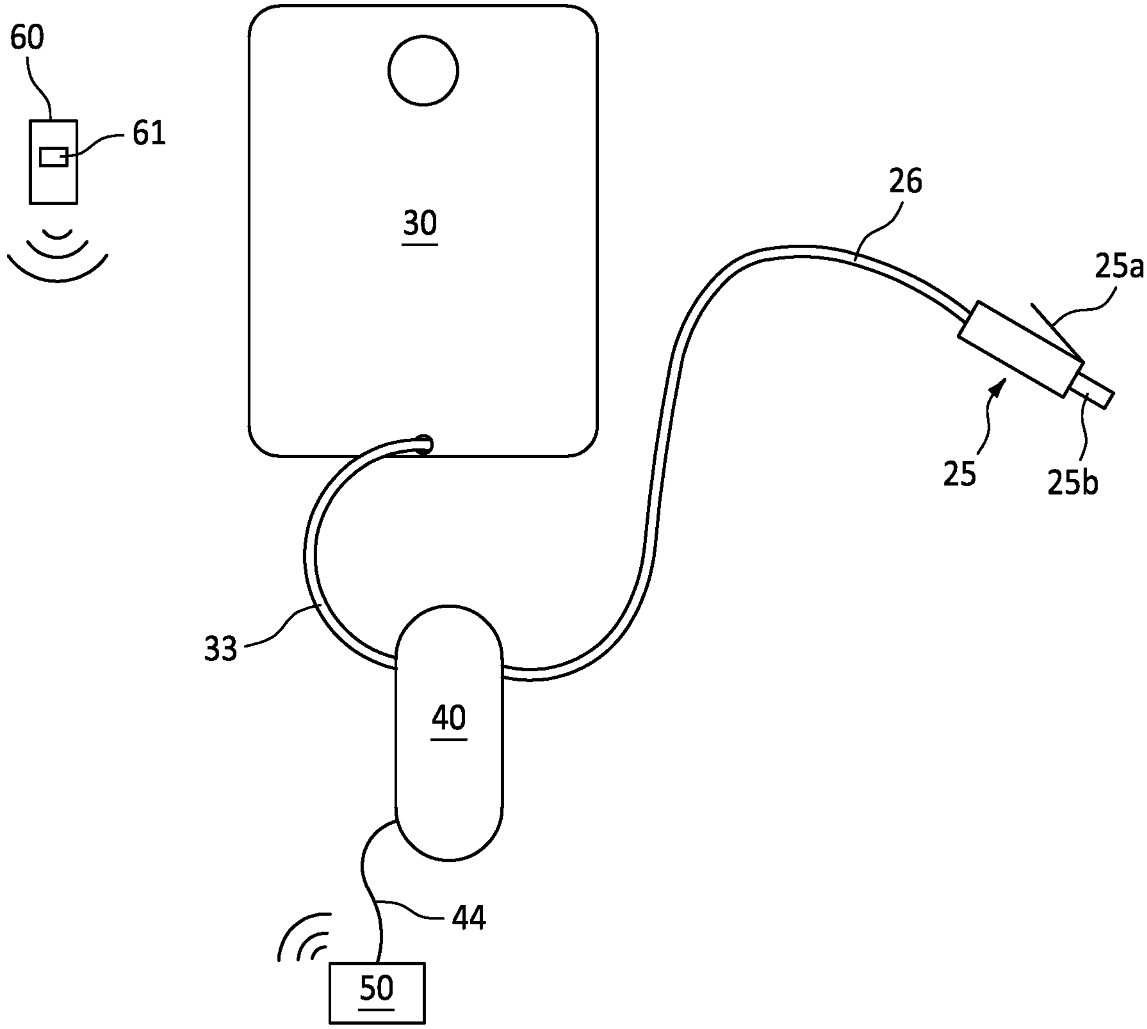
FIG. 2 is a perspective view of the liquid dispensing system components with the main body removed for ease of illustration.

As shown in FIG. 2 wherein the main body is removed for ease of illustration, the system can include a spray nozzle 25, a liquid storage bladder 30, an electric pump 40, a controller 50, and a remote-control unit 60. As described herein, the spray nozzle can be connected to an elongated discharge hose 26 and can include any number of different devices capable of allowing a user to selectively discharge liquid from the end of the nozzle when squeezing the trigger 25*a* in any number of different spray patterns. To this end, the distal end of the nozzle may include a fixed or manipulable opening 25*b*. Of course, any number of other types of nozzles such as pinch or twist-type nozzles are also contemplated.

Figure 3:
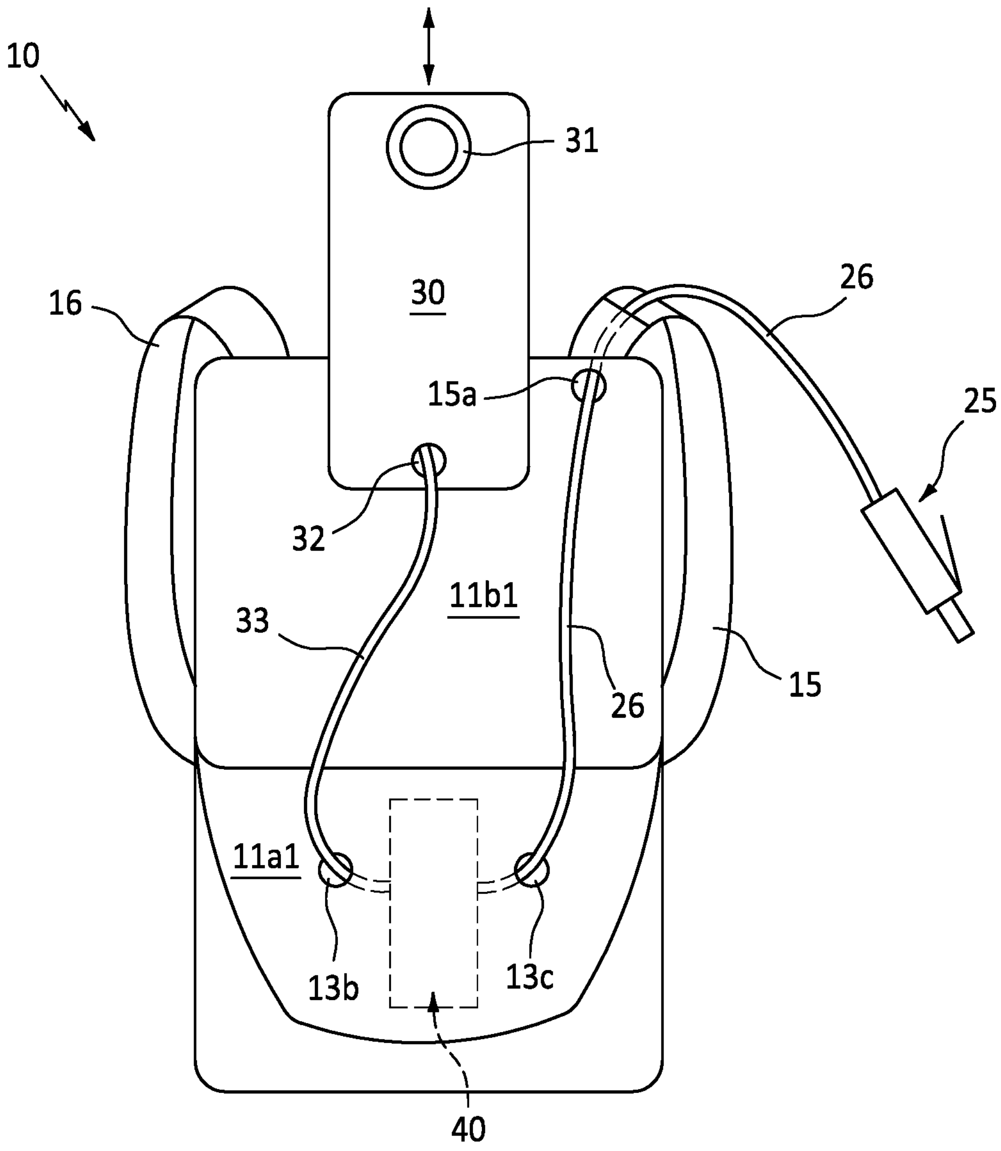
FIG. 3 is a front view of the liquid dispensing system in operation, in accordance with one embodiment of the invention.

As shown in FIG. 3, the storage bladder 30 can be removably positioned within the main pocket area of the backpack body 11 defined by the inside surface of the back panel 11*b*1 and the inside surface of the front panel 11*a*1. In the preferred embodiment, the bladder 30 will be constructed from durable and malleable plastic such as polyurethane, ethylene, and/or polyethylene, for example, and can include a storage capacity of between about 1 and 4 liters.

In one embodiment, the bladder can include a removable cap 31 along the top end for permitting a user to deposit liquids such as soapy water into the bladder, and an outlet 32 along the bottom end for dispensing the liquid into a supply hose 33. Of course, any number of other shapes, sizes, construction materials and/or storage capacities are also contemplated.

Figure 4:
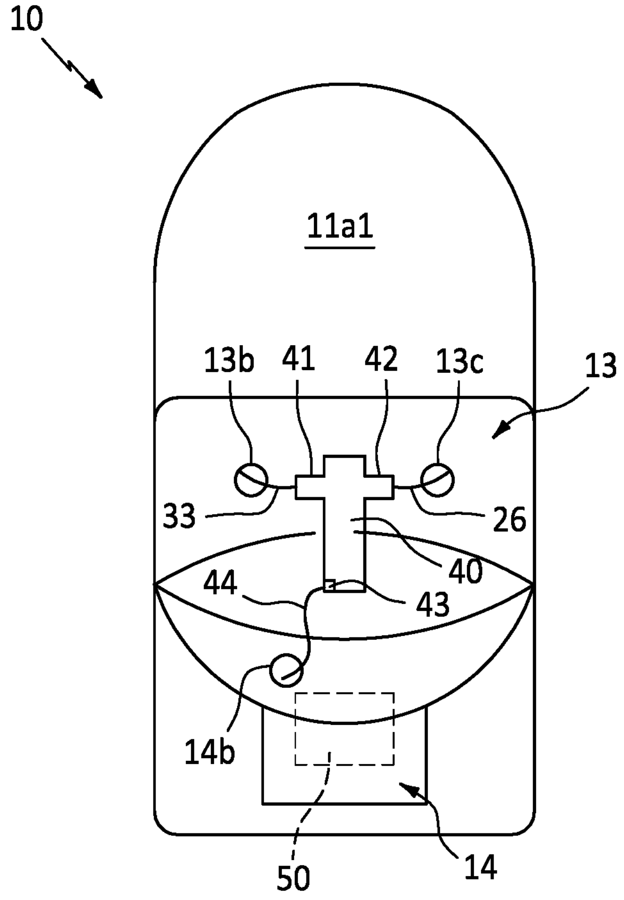
FIG. 4 is another front view of the liquid dispensing system in operation, in accordance with one embodiment of the invention.

As shown best at FIG. 4, the pump 40 can be positioned within the pump pocket 13 of the main body 11 and can function to receive fluids from the bladder 30 for discharge by the nozzle 25. As described herein, the pump 40 can include, comprise or consist of any type of battery-operated liquid pumping mechanism capable of functioning in the manner described herein. One suitable example of a pump 40 includes the 12V 1 GPM PowerFLO Electric Diaphragm Pump that is commercially available from DeLavan® Spray Technologies; however other pumps are also contemplated.

As shown, the pump can include a suction port 41 that is connected to the bladder 30 via the supply hose 33, a discharge port 42 that is connected to the dispenser 25 via the dispenser hose 26, and a communications port 43 that is electrically connected to the controller 50 via a communication cable 44. Each of the components 33, 26 and 44 can pass through openings 13*b*, 13*c* and 14*b*, respectively in the pockets, when the system is arranged in the manner illustrated.

Figure 5:
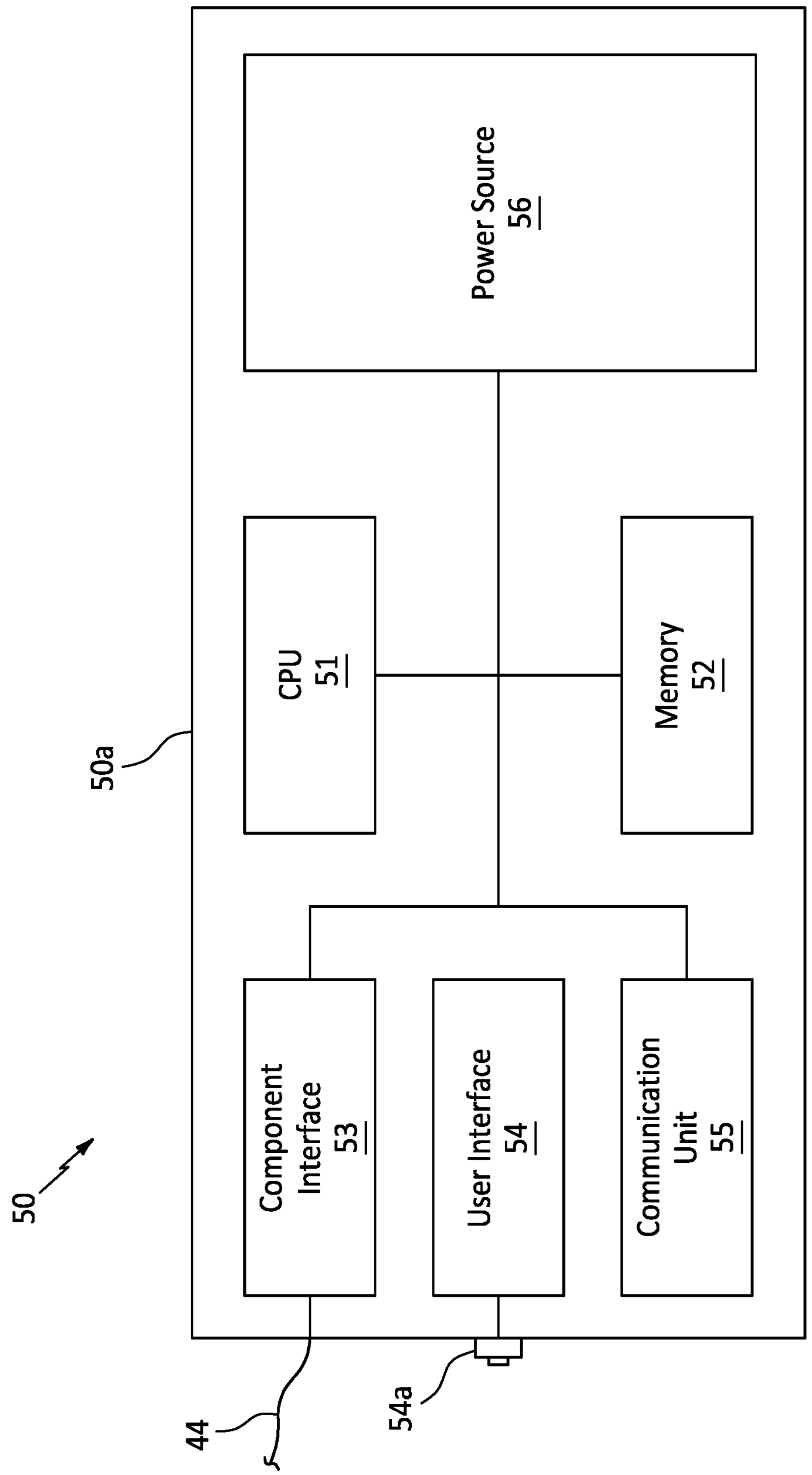
FIG. 5 is a simplified block diagram of the system controller of the system, in accordance with one embodiment of the invention.

The controller 50 can be positioned within the controller pocket 14 and can be connected to the pump 40 via the power and communication cable 44 that passes through opening 14*b*. FIG. 5 is a simplistic block diagram illustrating one embodiment of the system controller 50 that includes a processing unit 51 that is conventionally connected to an internal memory 52, a component interface 53, a user interface 54, a communication unit 55, and a power source 56.

Although illustrated as separate elements, those of skill in the art will recognize that one or more system components 51-56 may include, comprise, or consist of one or more printed circuit boards (PCB) containing any number of integrated circuit or circuits for completing the activities described herein. The controller will preferably be housed within a protective, impact resistant and watertight enclosure 50*a*, such as plastic, for example. Of course, any number of other analog and/or digital components capable of performing the described functionality can be provided in place of, or in conjunction with the described elements, and the controller may be located at other locations.

The processing unit 51 can include one or more central processing units (CPU) or any other type of device, or multiple devices, capable of manipulating or processing information such as program code stored in the memory 52 in order to allow the device to perform the functionality described herein.

Memory 52 can act to store operating instructions in the form of program code for the processing unit 51 to execute. Although illustrated in FIG. 5 as a single component, memory 52 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a solid-state micro hard drive, for example.

The component interface unit 53 can function to provide a communicative link between the processing unit 51 and the pump 40. In this regard, the component interface unit can include or can be connected to any number of different components such as the above-described communication cable 44, for example. Additionally, the component interface may also include any number of additional components such as one or more PIC microcontrollers, communication bus, connection cables, and the like for linking the various components.

The user interface 54 can include one or more buttons 54*a* accessible on the controller body in order to control the operation of the system. The buttons may function to allow a user to selectively activate the pump, deactivate the pump, and/or pair the controller with the remote-control device. Of course, any number of other functions may also be utilized via the user interface.

The communication unit 55 can include any number of components capable of sending and/or receiving electronic signals with another device, such as the remote control 60. In one embodiment, the communication unit can include a radio frequency transceiver for sending and receiving information with the controller 60, such as instructions to selectively activate or deactivate the pump. Of course, any number of other wireless transceivers such as a Bluetooth or Wi-Fi, for example are also contemplated.

The power source 56 can include one or more batteries capable of providing the necessary power requirements to each of the system components. In one embodiment, the batteries can be permanently located within the controller, or may be a separate battery pack having any number of individual cells that are connected to the controller and/or pump via power cables. In the preferred embodiment, the power source will be a rechargeable 12V DC battery pack having a port for receiving a charge via a cable.

As noted above, each of the primary components of the system e.g., the reservoir 30, the pump 40 and the controller 50 are located in separate pocket areas of the backpack body. Such a feature is an important design of the system as this allows each component to be individually protected from impact with foreign objects via the backpack body which may be designed to include padding to prevent damage to the system components and/or the vehicle in which the device is used. Additionally, the separate pockets allow a user to individually access each component and/or replace the same without having to remove all components and completely reconfigure the system in the event that any one component fails.

Of course, other embodiments are contemplated wherein one or more of the above noted components 30, 40 and 50 are positioned at locations other than the designated pockets. Moreover, some embodiments are contemplated wherein two or more of these components are positioned within the same pocket of the main body.

Figure 6:
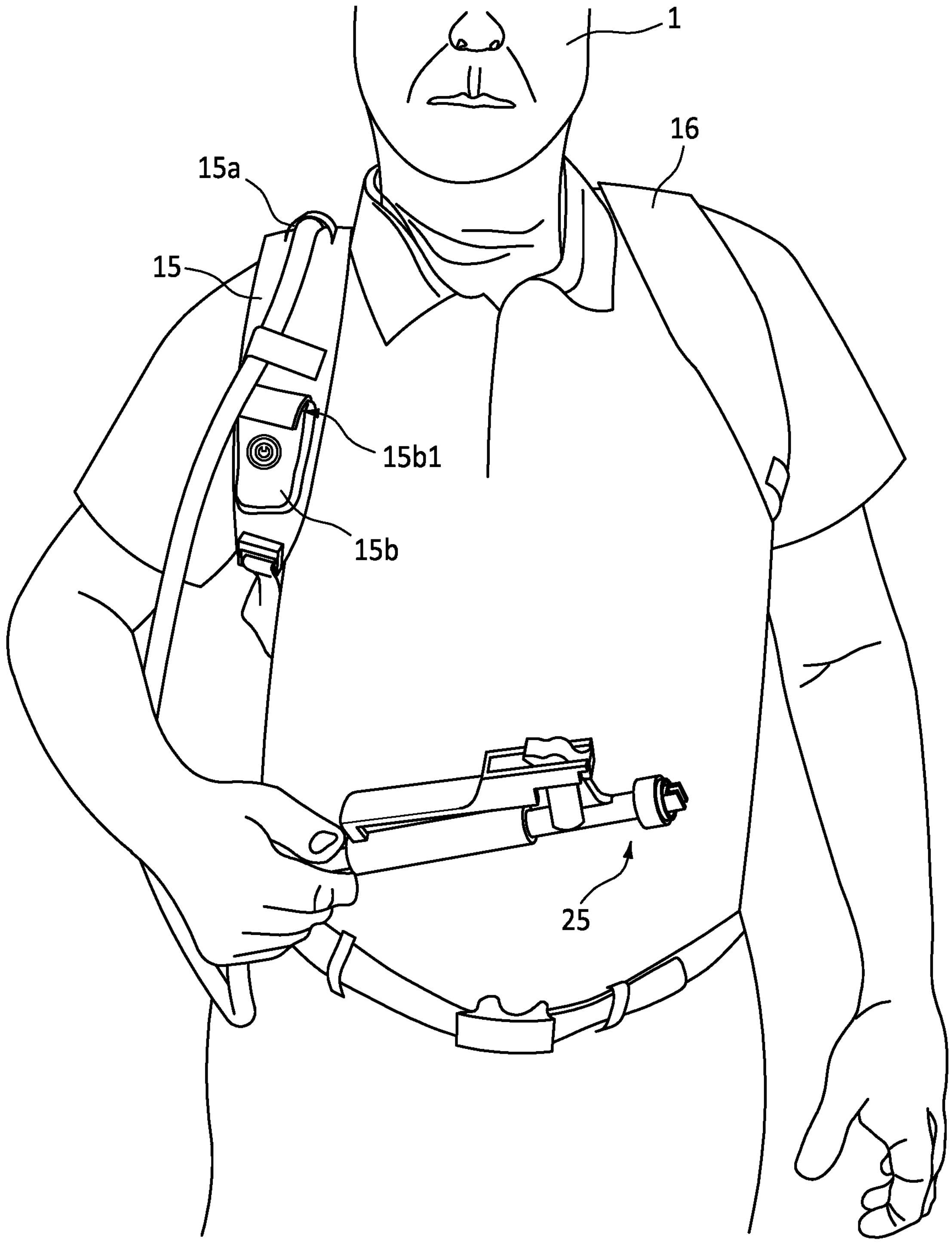
FIG. 6 is a perspective view of the liquid dispensing system in operation, in accordance with one embodiment of the invention.

FIG. 6 illustrates one embodiment of the system 10 in operation. As shown, the main body can be worn on the back of a user 1 such that the shoulder straps 15 and 16 are positioned over the user's shoulders. The remote control can be positioned within the pocket 15*b* and can be accessible via an opening 15*b*1 in the pocket or via a marking on the pocket which, when pressed, activates the button(s) 61 on the remote control.

In operation, the remote control communicates with the controller in order to selectively activate and deactivate the pump 40, thereby enabling the user to fully control the pump and system components without having to remove the backpack from their body and/or access any of the individual pockets.

When the pump is activated, the user can dispense fluid via the nozzle 25 while wearing the device. Moreover, because the supply hose 26 is routed through the backpack strap 15 via opening 15*a*, the nozzle is within easy reach of the user's hand(s) at all times. Although not specifically illustrated, any number of other pockets or sleeves may be provided along the main body for allowing the user to store the nozzle when the same is not actively being used.

Although described above with regard to the nozzle and remote being located on the strap 15 for right-handed users, other embodiments are contemplated wherein such components are located on the opposite strap 16 for more efficient use by left handed individuals and/or any number of other locations along or within the main body.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:

a malleable main body having at least one strap for securement to a user;

a water reservoir positioned within the malleable main body;

a battery operated electric pump connected to the water reservoir;

a controller that is connected to the pump;

a wireless remote control unit that is configured to selectively operate the pump; and a dispenser nozzle that is connected to the pump via a hose, wherein the main body includes an opening that is positioned along the at least one strap, and a pocket that is positioned along the at least one strap, and wherein the hose and the dispenser nozzle extend outward from the opening, and the wireless remote control unit is configured to be positioned within the pocket.

2. The system of claim 1, wherein the water reservoir is positioned within a first pocket of the main body.

3. The system of claim 2, wherein the pump is positioned within a second pocket of the main body.

4. The system of claim 1, further comprising:

a power source that is in communication with the controller.

5. The system of claim 4, wherein the power source includes a rechargeable battery pack.

6. The system of claim 4, wherein the controller includes a user interface.

7. The system of claim 6, wherein the user interface includes functionality for selectively activating and deactivating the pump.

8. The system of claim 4, wherein the water reservoir is positioned within a first pocket of the main body, the pump is positioned within a second pocket of the main body, and the controller is positioned within a third pocket of the main body.

9. The system of claim 1, wherein the malleable main body is constructed from a fabric material.

10. The system of claim 1, wherein the water reservoir is removably positioned within the malleable main body.

11. The system of claim 10, wherein the water reservoir comprises a malleable and flexible member.

12. The system of claim 10, wherein the water reservoir includes a liquid storage capacity of between 1 and 4 liters.

* * * * *